United States Patent
Salo et al.

(10) Patent No.: US 6,202,109 B1
(45) Date of Patent: Mar. 13, 2001

(54) METHOD FOR TRANSMITTING A DIGITAL AUDIO SIGNAL

(75) Inventors: Jouko Salo; Ari Aho; Riku Rimpelä; Vesa Köppä, all of Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/198,771

(22) Filed: Nov. 24, 1998

(30) Foreign Application Priority Data

Dec. 1, 1997 (FI) ........................................ 974380

(51) Int. Cl.[7] ..................................... G06F 13/00
(52) U.S. Cl. .......................... 710/101; 710/102; 710/128
(58) Field of Search .................... 710/102, 101, 710/103, 129, 128, 126

(56) References Cited

U.S. PATENT DOCUMENTS

| | | | |
|---|---|---|---|
| 5,072,442 | * 12/1991 | Todd | 370/265 |
| 5,297,231 | 3/1994 | Miller | 395/2.1 |
| 5,701,515 | * 12/1997 | Gradeler | 710/14 |
| 5,786,782 | 7/1998 | Ostman et al. | 341/141 |

FOREIGN PATENT DOCUMENTS

| | | |
|---|---|---|
| 0 680 155 A1 | 11/1995 | (EP) . |
| 9405675 | * 5/1994 | (WO) ................. H04B/1/38 |
| WO 94/29968 | 12/1994 | (WO) . |
| WO 95/34958 | 12/1995 | (WO) . |

OTHER PUBLICATIONS

European Search Report dated Jul. 7, 2000, 2 pages.

* cited by examiner

*Primary Examiner*—Ario Etienne
(74) *Attorney, Agent, or Firm*—Perman & Green, LLP

(57) ABSTRACT

The invention relates to a method for transmitting a digital audio signal between an electronic device (1) and an expansion card (13) connected to a expansion card connection (8*a*) in the electronic device. The expansion card (13) comprises at least one data transmission bus (20) for transmitting control and data signals, means (16) for processing digital signals, and an expansion card connection (8*b*). The expansion card (13) comprises further a second data transmission bus (21), wherein digital audio signals are transmitted via said second data transmission bus (21).

15 Claims, 4 Drawing Sheets

METHOD FOR TRANSMITTING A DIGITAL AUDIO SIGNAL

BACKGROUND OF THE INVENTION

The present invention relates to a method for transmitting a digital audio signal via an expansion card connector as set forth in the introductory part of the appended claim 1, an expansion card as set forth in the introductory part of the appended claim 8, as well as a mobile station as set forth in the introductory part of the appended claim 15.

In digital mobile communication networks, the audio signal is transmitted in digital form, whereby an analog audio signal must be converted into digital form before transferring it to the mobile communication network. In a corresponding manner, in a mobile station at the receiving stage, the digital audio signal is converted into an analog audio signal e.g. for conducting it to a loudspeaker. For example in a GSM mobile station, pulse code modulation (PCM) can be used in the analog/digital conversion. In addition to analog to digital and digital to analog conversions, also signal filtering, encryption and other measures are taken, if necessary, in a known manner, but there is no need to describe them in detail in this context.

In current digital mobile stations, the processing of audio signals takes place largely in the digital signal processing unit DSP. The analog to digital and digital to analog conversions of the audio signal take place in a codec, advantageously a PCM codec. In conventional digital mobile stations, the serial input/output port (SIO) of the digital signal processing unit is connected directly to the codec. In mobile stations, audio signals are transmitted in digital form primarily within the digital signal processing unit as well as between the digital signal processing unit and the codec.

Particularly in connection with portable data processors (PC), mobile station applications have been developed where at least the transmitter/receiver unit TX/RX of the mobile station is arranged in card form in accordance with the PCMCIA standard. This kind of an extension card can be advantageously used e.g. for transmission of data between data processors via a mobile communication network. Thus, the expansion card is used as a modem for the data processor. However, expansion cards of this kind are also equipped with properties for transferring an audio signal e.g. for setting up an ordinary voice connection via the mobile communication network. In expansion cards of prior art, the audio properties are implemented in a way that the expansion card is provided with a codec for conducting the analog-to-digital and digital-to-analog conversions required for the digital audio signal. Further, the expansion card is provided with an audio connector or the like e.g. for connecting an earpiece and a microphone with the codec. However, this solution has the disadvantage that the codec and the connector raise the manufacturing costs of the expansion card and require space on the expansion card.

In the international standard TIA PN-3131: "Voice Control Standard for Asynchronous DCE", it is presented that in expansion cards, the audio signal should be transmitted through the expansion card connector via the same serial bus than the control signals (control data). On the other hand, this standard supports only the telephone answering function, wherein it is necessary to transfer audio signals simultaneously in only one direction at a time, i.e. a half duplex mode, because the standard assumes that an expansion card like this has a separate external audio connector. However, telephones usually require simultaneous transmission of audio signals in both directions, i.e. a full duplex mode. It has been found in practice that the transfer capacity of this serial bus is not sufficient for transmitting both control signals and full duplex voice signals.

SUMMARY OF THE INVENTION

It is an aim of the present invention to accomplish a method for transmitting a digital audio signal via an expansion card connector, and an electronic device with an expansion card connector, through which it is possible to transmit digital audio signal simultaneously in two directions. The invention is based on the idea that in the transmission of a digital audio signal between the electronic device and the expansion card, a different bus is used than the bus used in the transmission of control and data signals. The method of the present invention is characterised in what will be presented in the characterising part of the appended claim 1. The expansion card of the present invention is characterised in what will be presented in the characterising part of the appended claim 8. Further, the mobile station of the invention is characterised in what will be presented in the characterising part of the appended claim 15.

The present invention gives significant advantages to the methods and electronic devices of prior art. A codec and an audio connection can be eliminated from the expansion card, wherein the expansion card becomes simpler and its manufacture is less expensive. Further, the application of the invention will not require considerable changes in the hardware or software of current expansion cards.

BRIEF DESCRIPTION OF THE DRAWING

In the following, the invention will be described in more detail with reference to the appended drawings, in which.

DETAILED DESCRIPTION OF THE INVENTION

Figure 1:
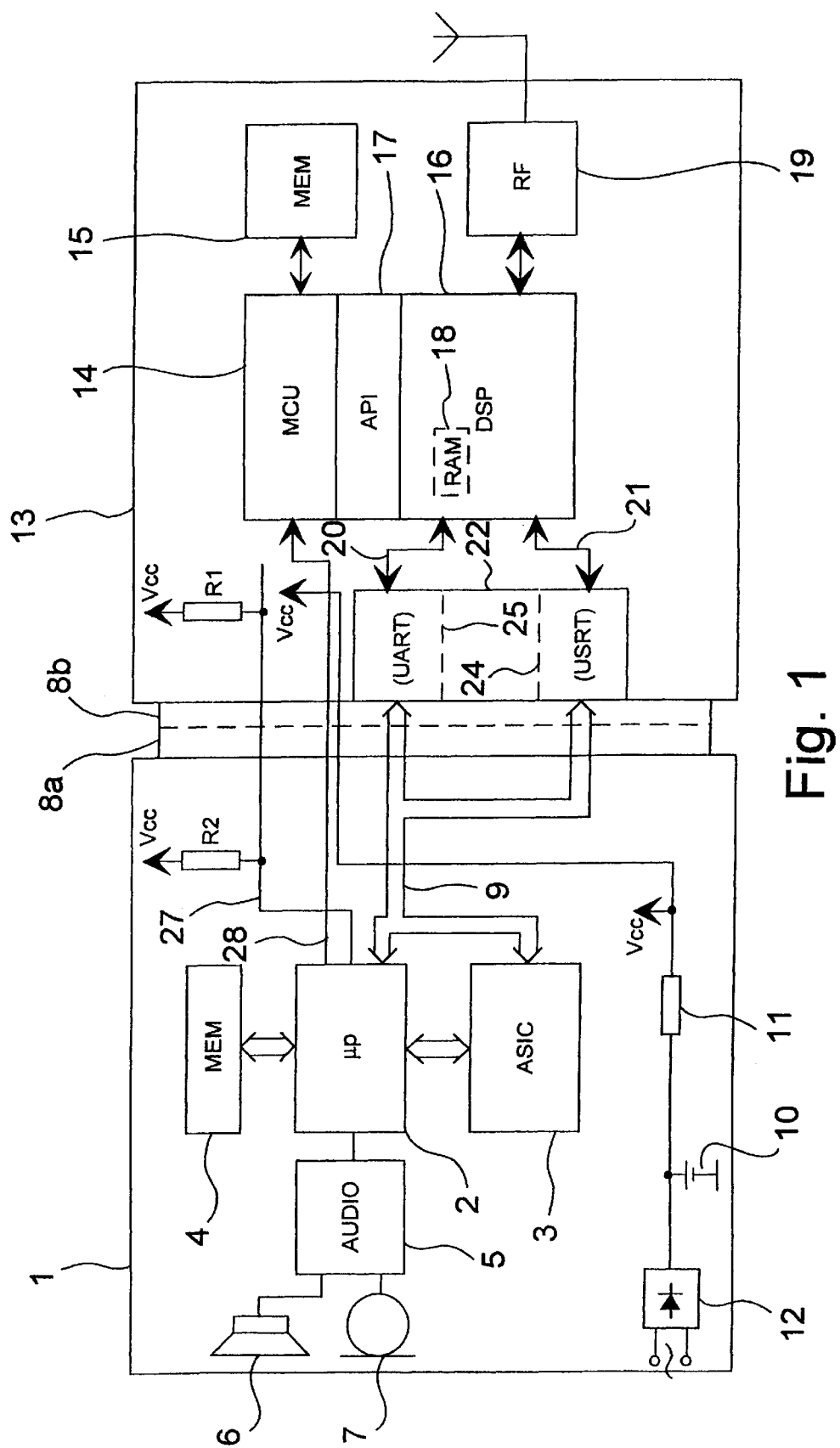
FIG. 1 is a block diagram showing a device in which the invention can be advantageously applied.

In the application example of FIG. 1, the electronic device 1 used is a portable data processor comprising e.g. a controller 2, such as a microprocessor, for controlling primarily the operations of the data processor 1. The data processor 1 comprises further an application specific 30 integrated circuit 3 (ASIC), whereby a majority of the logic functions of the data processor 1 can be implemented, simultaneously reducing the number of separate logic circuits in the data processor 1. Also, the data processor 1 comprises a memory 4, such as a program memory for storing the basic software of the data processor 1 and a data memory e.g. for storing information required during the use. Further, the data processor 1 of FIG. 1 comprises an audio block 5 which is used also as an audio coding/decoding block during a call, a loudspeaker 6, and a microphone 7, wherein the data processor can be used for generating audio messages and receiving e.g. control commands given by the user, if the operating system of the data processor provides a possibility for control by audio commands.

Further, the electronic device 1 comprises one or several expansion card connections 8a implemented e.g. in accordance with the PCMCIA standard, but the invention is not limited solely to connections of this type. Thus, the expansion card connection 8a of the electronic device comprises a male connector and the expansion card connection 8b of the expansion card comprises a female connector, respectively. The connection lines and pins of the connector 8a, 8b are not shown in full but in a reduced manner so that they comprise only the features that are most essential for understanding the specification.

In the electronic device, there is a connection bus consisting of address, control and data buses conducted from the microprocessor 2 and the application-specific logic circuit 3 to the expansion card connection 8a, for transmitting address, control and data signals between the expansion card 13 and the electronic device 1.

The operational voltages required by the data processor 1 are generated by a battery 10 via a voltage conversion coupling 11. The battery 10 of the data processor 1 can be recharged, when necessary, e.g. from the mains voltage by a charging device 12.

In this application example of FIG. 1, the expansion card 13 is not provided with a separate operational voltage source but it receives its operational voltage from the voltage conversion coupling 11 of the data processor used as the electronic device 1, via the expansion card connection 8a, 8b.

The loudspeaker 6 and microphone 7 of the data processor 1 can be integrated in the housing of the data processor 1, or it is possible to use an external loudspeaker and microphone which are connected to the data processor 1 by wiring.

In the example of FIG. 1, the expansion card 13 is a PCMCIA type card comprising the most essential functional blocks of a mobile station, shown in a reduced manner in FIG. 1. The operations of the expansion card 13 are controlled primarily by a controller 14, such as a microcontroller MCU (microcontroller unit). The controller 14 is equipped e.g. with a memory 15, such as a program and data memory (ROM, RAM). For signal processing, the expansion card 13 has a digital signal processing unit 16. The controller 14 and the digital signal processing unit 16 are connected to each other by a control and data connector 17, by means of which the controller 14 can e.g. transmit control data to the digital signal processing unit 16 and load setting and other information in the data memory of the digital signal processing unit 16. The control and data connector 17 comprises e.g. a dual port memory circuit (dual port RAM). In the dual port memory circuit, one port, i.e. the first control and data bus, is connected to the control and data bus of the controller 16, and the second port is connected to the control and data bus of the digital signal processing unit 16. Data can be transmitted from the controller 14 to the digital signal processing unit 16 via the dual port memory circuit advantageously so that the controller 14 writes the data (bytes) to be transmitted, in the memory area of the first port. Next, the controller 14 writes one byte in a certain address of the first port, causing a change of state in an interrupt line (not shown) in the second port. This interrupt line is connected to the interrupt line of the digital signal processing unit 16 (not shown), wherein the digital signal processing unit 16 moves on to run a corresponding interrupt service program. This interrupt service program is designed to comprise commands whereby the digital signal processing unit 16 reads the corresponding memory area from the dual port circuit and saves the read data in is own data memory 17. Reading the data returns the state of the interrupt line. In the reverse direction, data is transmitted in a corresponding manner.

Figure 4:
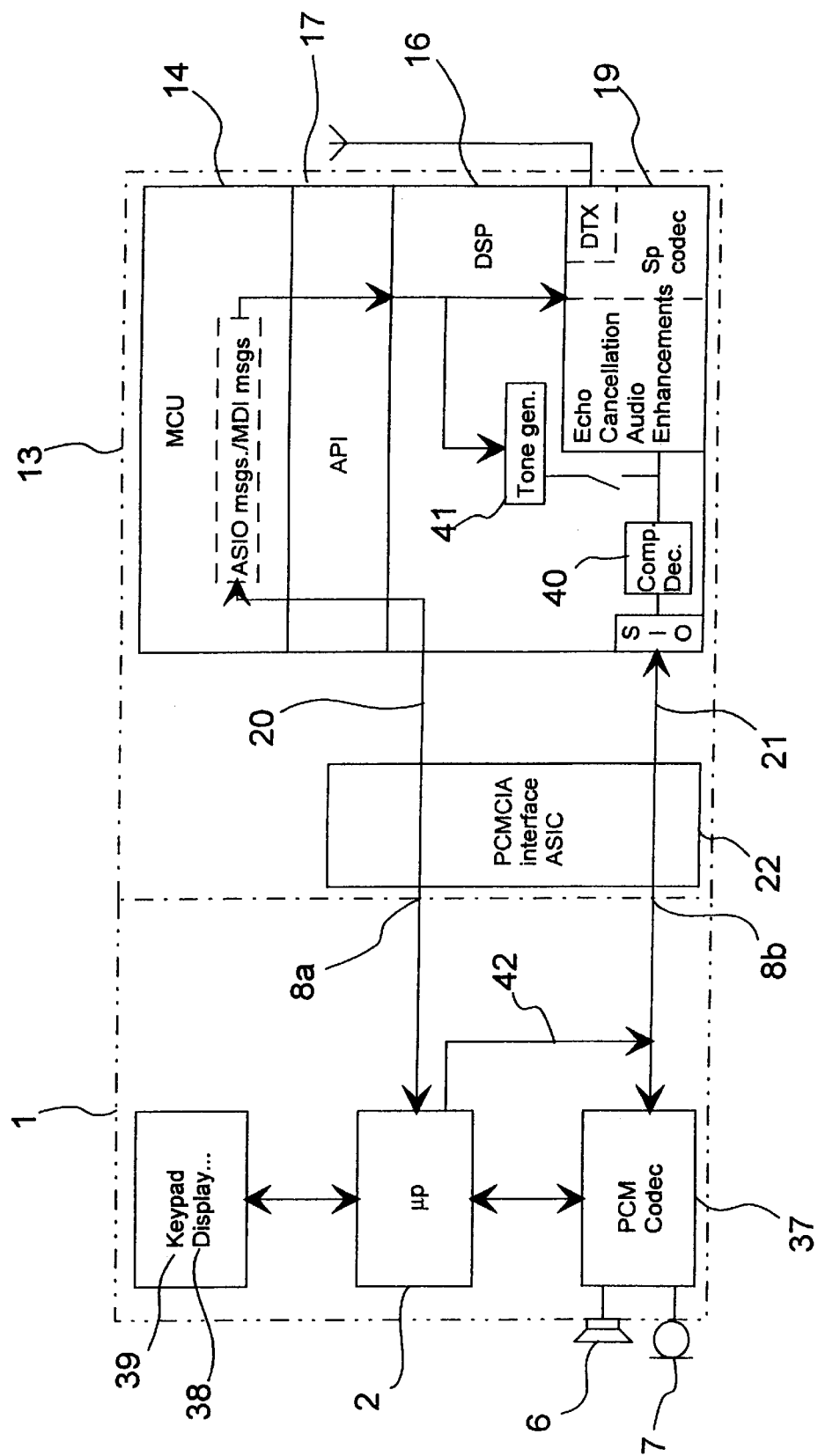
FIG. 4 shows still another device in which the invention can be advantageously applied.

The digital signal processing unit 17 processes also demodulated signals coming from a high frequency part 19 (RF). The purpose of the digital signal processing unit 16 is e.g. to attenuate noise and interference in the received and demodulated signal, to modify the received demodulated audio signal according to the loudspeaker 6 or the like to be used at the time, to attenuate background noise from the microphone signal, etc. In the digital signal processing unit 16, it is possible to apply several signal processing algorithms by programming the program commands corresponding to these operations in the application software. Thus, several types of filters can be accomplished, including filters which are not possible or sensible to implement by the analog technique. The block diagram of FIG. 4 shows e.g. a digital audio signal compression/decompression block 40 and a sound generator 41 which are implemented advantageously in the digital signal processing unit 16.

Figure 2:
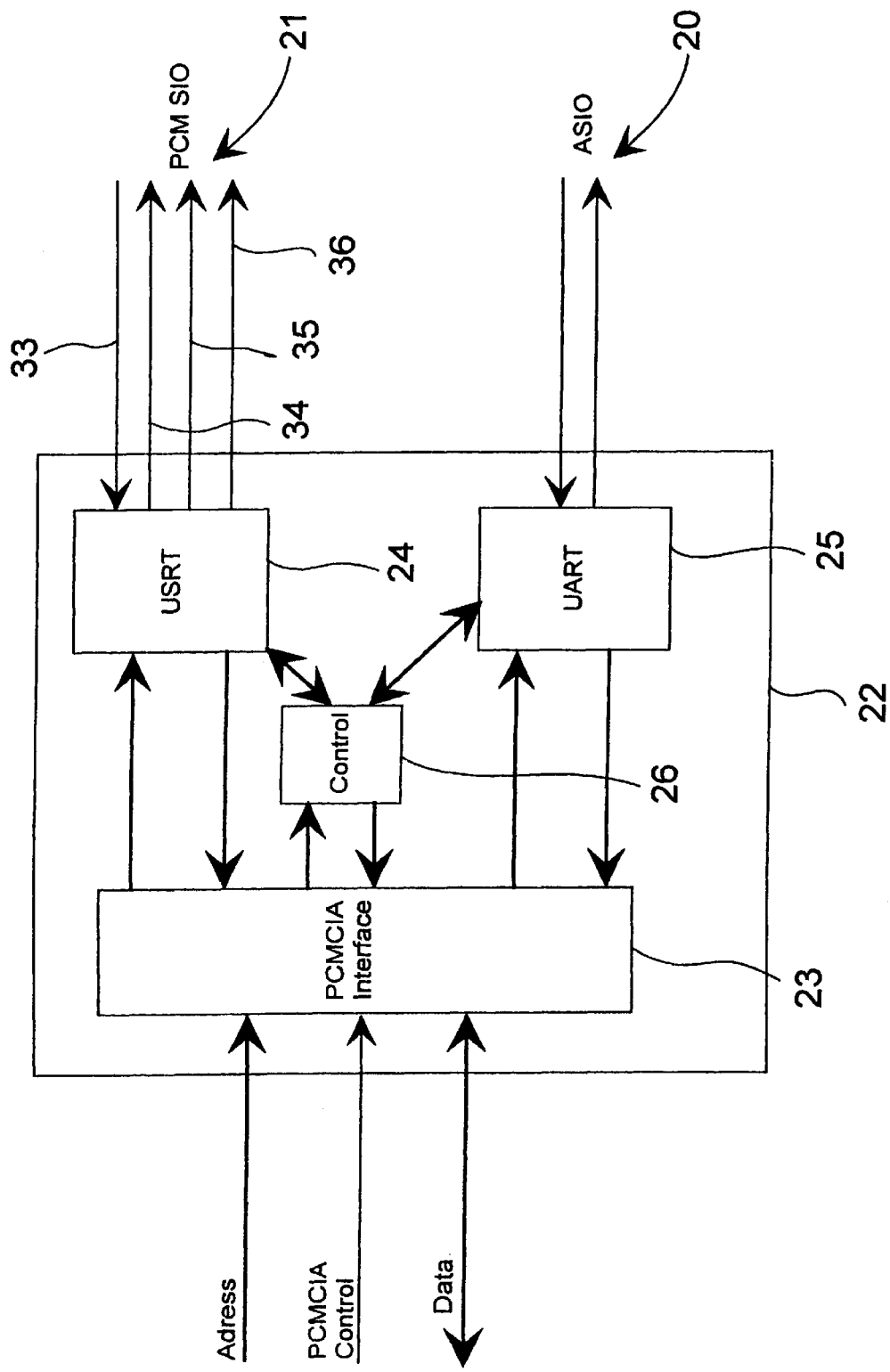
FIG. 2 shows a functional block diagram on a bus connection circuit for an expansion card according to the invention.

The digital signal processing unit 16 is connected by an asynchronous serial bus 20 (ASIO) and a synchronous serial bus 21 (PCMBUS) to a bus connection circuit 22 (PCMCIA Interface ASIC), preferably an application specific logic circuit. The functional block diagram on this bus connection circuit 22 is shown in the appended FIG. 2. The bus connection circuit comprises e.g. an expansion card connector block 23 (PCMCIA Interface), a synchronous series connection block 24 (USRT) and an asynchronous series connection block 25 (UART). For timing and control, there is still a control block 26. When the expansion card is in the first function mode, which in this example is the function mode complying with the PCMCIA standard, the synchronous series connection block 24 conducts the audio signal serial/parallel conversion and the transmission and receipt of the audio signal in a synchronised manner between the digital signal processing unit 16 and the bus connection circuit 22. The asynchronous series connection block 25 is used for the transmission of data frames and control information between the electronic device 1 and the expansion card 13. The asynchronous series connection block 25 conducts the series/parallel conversions of control and data signals and conducts data transmission and reception in the asynchronous serial bus 20. The above-mentioned serial/parallel conversions are needed in the first function mode, because thus data transmission in the expansion card connection 8a, 8b is carried out in parallel form but data transmission in the asynchronous 20 and synchronous serial bus 21 is carried out in serial form.

The first function mode is used e.g. when the electronic device 1 and the expansion card 13 transmit information, such as digital samples formed of a speech signal (speech samples) and control information during voice and data calls. Digital samples, i.e. the digital audio signal, are transmitted via the synchronous series connection block 24, and data frames and control information are transmitted via the asynchronous series connection block 25. Data transmission in the connector according to this embodiment is carried out in parallel form in the first function mode.

The following is an example describing how the electronic device 1 and the expansion card 13 can communicate via the expansion card connector 8 in the first function mode. The expansion card 13 is set to operate e.g. as a connector card (I/O). For example the PCMCIA standard contains a more detailed description on the requirements of different card types (I/O card and memory card) with expansion cards according to the PCMCIA standard, for example in view of the register structure and connection pins. In this context, it is said briefly that certain memory areas and connection areas can be addressed by the controllers 2, 14.

The size of the memory area is typically considerably larger (even several megabytes) than the size of the whole connection area (a few hundred bytes or kilobytes). Separate control lines (such as read and write lines) are arranged for processing the memory area, and in a corresponding manner, separate control lines (such as read and write lines) are arranged for processing the connection area. The area that is intended for processing at a time, is addressed by address lines of an address bus, e.g. 32 address lines for addressing the memory area and some of which (8/16) are used for addressing the connection area. It is more closely defined by the control lines which area is to be processed and, on the other hand, whether the controller is to read or write data. A data bus is used for reading and writing data.

The asynchronous series connection block 25 and the synchronous series connection block 24 are defined in different physical addresses in the connection area. In memory cards, the address area used is preferably the memory area. The address area contains e.g. 256 bytes, whereby eight address lines (A0 . . . A7) are required for addressing them. The microprocessor 2 of the electronic device sets the desired device address in the address bus of the connection bus 9. After this, the state of the read line in the control bus is set into a state in which information is transferred from the expansion card 13 to the data bus of the expansion card connector 8. Typically a reverse logic is used, i.e. when the read line is in the logical 1 state, no data is written on the data bus, and, respectively, writing is allowed in the logical 0 state. Writing via the expansion card connector 8 to the expansion card 13 takes place advantageously in a manner that the microprocessor 2 sets the data to be written in the data bus of the connection bus 9 and sets in the address bus the address corresponding to the series connection block 25, 24 where the data is intended to be written, and after this the state of the write line in the control bus of the connection bus 9 is set in the logical value corresponding to the state allowing writing, e.g. the logical 0 state. Thus, the data that was in the data bus of the expansion card connector is transferred by the expansion card 13 into a buffer (not shown), from which the data can be transformed into serial form and transmitted to the serial bus 20, 21 according to whether it was written in the asynchronous series connection block 25 or the synchronous series connection block 24.

The control information and the data frames are conveyed from the digital signal processing unit 16 to the controller 14 of the expansion card via the control and data connector 17. The controller 14 of the expansion card processes the control information, and e.g. on the basis of the control information, it controls the operation of the digital signal processing unit 16.

The expansion card 13 can be set also in a second function mode which ib the expansion card according to this example is a function mode deviating from the PCMCIA standard. In this second function mode, both the synchronous serial bus 21 and the asynchronous serial bus 20 are connected via the synchronous 24 and asynchronous series connection block 25 directly to the expansion card connection 8b. Thus, the signals of the serial buses 20, 21 are transmitted in serial form to the electronic device 1. In this function mode, it is possible to implement e.g. a digital audio interface (DAI) required by the GSM standard for GSM type approval tests if the expansion card 13 is intended for use in connection with a GSM mobile communication network, without any changes in the software or the hardware.

In the following, the operation of the coupling of FIG. 1 will be described in those respects that are necessary for appreciating the invention.

After turning on the voltages, the microprocessor 2 of the electronic device 1, i.e. in this embodiment the data processor, conducts the initialisation procedure e.g. for loading the operational system into the data memory 4 e.g. from a hard disk (not shown). After the initialisation procedure, the use of the data processor 1 can be started e.g. by starting an application program, such as a terminal program or a telephone program. In a corresponding manner, the controller 14 of the expansion card conducts its own initialisation procedure according to the program commands stored in the memory 15 of the expansion card. The initialisation procedure comprises e.g. starting the operation of the digital signal processing unit 16 and loading the parameters into the data memory 18 of the digital signal processing unit.

At the starting stage, the expansion card 13 examines also the logical state of the mode selection line 27. If the state of the mode selection line 27 is the logical 1 state, which in this embodiment corresponds to a voltage value of ca. the operating voltage Vcc, the pins of the expansion card connection 8a, 8b are set to a use corresponding to the first function mode. In a corresponding manner, when the state of the mode selection line 27 is the logical 0 state, i.e. ca. 0 V, the pins of the expansion card connection 8a, 8b are set to a use corresponding to the second function mode. It is obvious that the mode selection values presented above are only given as examples. For the expansion card 13, the mode selection line 27 is an input line. In the mode selection line 27, a pull up resistance R1, R2 is coupled on the expansion card 13 and in the electronic device 1, accomplishing that without a separate control, the mode selection line 27 is set in the logical 1 state. The state of the mode selection line 27 can be set by the electronic device 1 to the logical 0 state by connecting the line 27 to the ground potential. This connection can be made in a manner known as such, for example in a way that the mode selection line 27 is connected to the binary output pin of the microprocessor 2 of the electronic device, wherein the state of this pin can be set in the application software of the microprocessor 2 either ca. 0 V or approximately the operating voltage Vcc.

Further, a reset line 28 is connected to the expansion card, for the purpose of maintaining the controller 14 of the expansion card in the initial state as long as the microprocessor 2 of the electronic device has run at least part of its initialisation procedure. After the microprocessor 2 of the electronic device has changed the state of this reset line from the first state, i.e. the reset state, to the second state, i.e. the enabling state, the controller 14 of the expansion card begins to conduct its own initialisation procedure. The reset state is e.g. a voltage value corresponding to the logical 0 state, and the enabling state is thus the value corresponding the logical 1 state.

In the selection of the function mode of the expansion card 13, it is possible to use advantageously a configuration option register (COR) formed in the bus connection circuit 22 of the expansion card. This configuration option register comprises advantageously one bit, whose value can be changed to change the function mode. When using more than two function modes, the configuration option register COR comprises more mode selection bits, respectively. The mode selection bit of the configuration option register is preferably set by the microprocessor 2 of the electronic device, by writing the desired bit pattern in the address corresponding to the configuration option register in the expansion card connection 8a, 8b, wherein this bit pattern becomes the value for the configuration option register COR.

After all the necessary initialisation procedures, the expansion card 13 can be used e.g. for setting up voice calls.

This will be described in the following, in connection with an electronic device 1 and expansion card 13 according to an advantageous embodiment of the invention, which are set in the first function mode.

Figure 3:
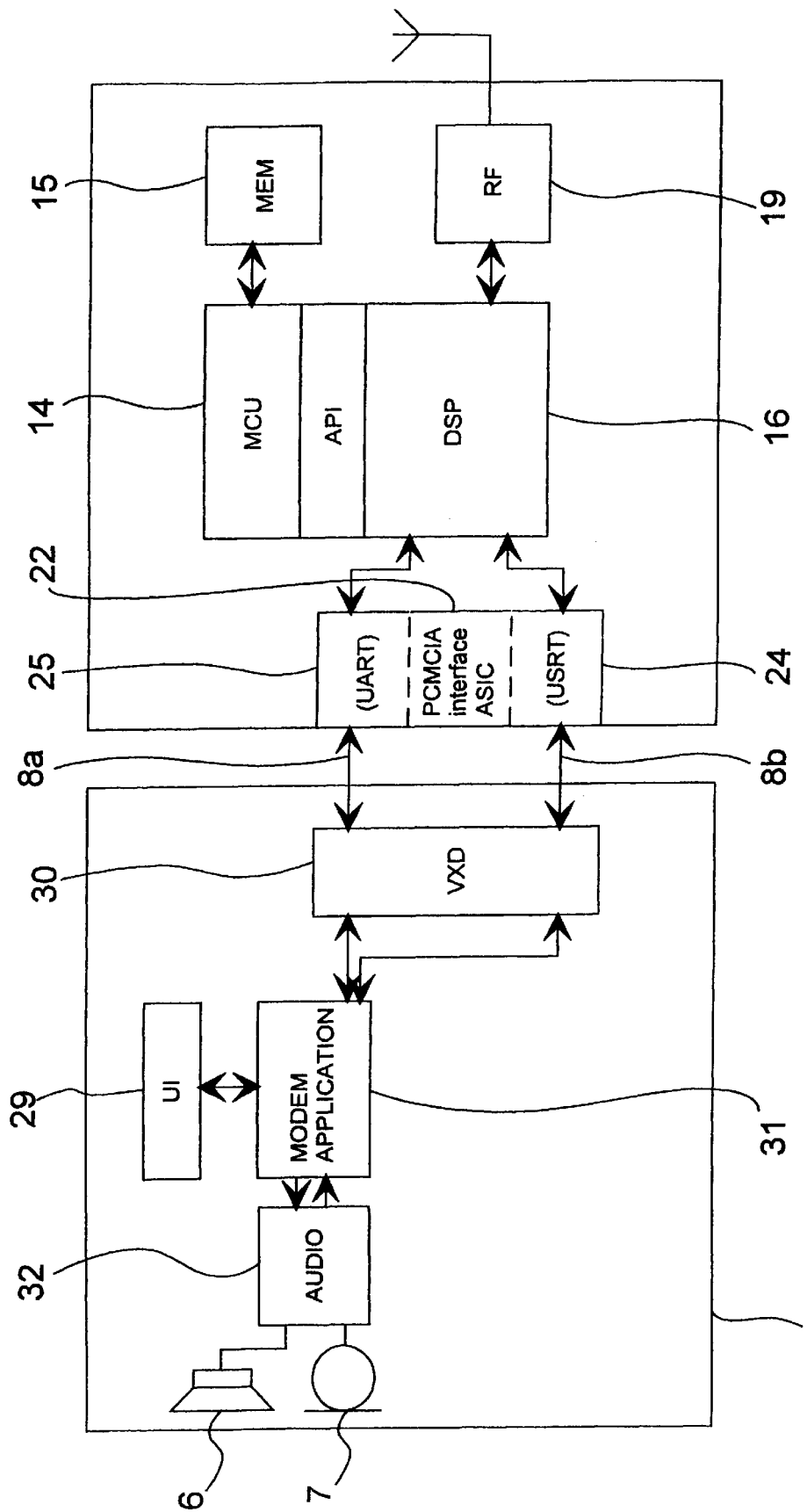
FIG. 3 illustrates the route of control and audio signals in functional blocks.

The user of the electronic device 1 starts e.g. a telephone application program 29, by means of which it is possible to control the operation of the electronic device 1 and the expansion card 13. If the electronic device 1 is a data processor, such as a personal computer (PC) or a portable computer (laptop PC), this telephone application program 29 can be loaded by means of operating system commands. The Windows 95 operating system developed by Microsoft Corporation has recently become common in portable computers. The appended FIG. 3 illustrates the operation of the invention in connection with such a data processor 1. In FIG. 3, the route of control and audio signals is shown in functional blocks. The operations corresponding to these blocks are implemented primarily in the application software of the data processor 1 and in the application software of the expansion card 13.

At the stage of loading the telephone application program 29 (user interface, UI), also a virtual device driver 30 (VxD) and a modem application 31 are loaded in the electronic device 1. The operating system takes care of the transmission of data between the telephone application program, the modem application and the virtual device driver 29, 30, 31. The modem application 31 converts the control data, such as a telephone number coming from the telephone application program 29, advantageously into AT commands or the like, known as such. These AT commands are given e.g. in the standard ETSI 07.07. The virtual device driver 30 is used to control, on the basis of control commands coming through the modem application 31, the expansion card connection 8a, 8b e.g. for transmitting the control commands and the audio signal to the expansion card 13. This virtual device driver 30 also reads the control commands coming from the expansion card 8a, 8b and converts them into a form suitable for the telephone application 29. Further, the virtual device driver 30 reads the audio signals coming from the synchronic series connection block 24 via the expansion card connection 8a, 8b, conducts the decompression of the audio signals, if necessary, and transmits them to the modem application 31. The modem application 31 decodes the audio signals and conducts them via the audio block 32 to the loudspeaker 6 of the electronic device, for generating a sound signal corresponding to the audio signal.

In the microphone 7 of the electronic device, the sound signal is converted into an electric, analog audio signal. In the audio block 32, the signal is converted into a digital, advantageously PCM coded audio signal which is transmitted via the modem application 31 to the virtual device driver 30. The virtual device driver 30 compresses the digital audio signal, if necessary, and transmits it via the expansion card connection 8a, 8b into the asynchronous series connection block 24 of the expansion card, advantageously in bytes having a width of eight or sixteen bits.

The synchronous series connection block 24 transmits the bytes further to a synchronous serial bus 21. This synchronous serial bus 21 comprises, in addition to a transmitting line 33 and a receiving line 34, a bit synchronisation line 35 and a byte synchronisation line 36. The bit synchronisation line 35 synchronises the bits to be transferred to the bus 21 for the receiving end. The byte synchronisation line 36, in turn, synchronises each transmitted byte so that the receiver can find out which received bits belong to the same byte.

In the expansion card according to an advantageous embodiment of the invention, the synchronous serial bus 21 can operate either in a continuous mode or in a block mode. In the continuous mode, synchronisation signals (PCMSClk) are generated in the series connector circuit 22, preferably in the control block 26, for transmission of the bytes. In an advantageous embodiment, the frequency of the synchronisation signal is ca. 8 kHz, whereby it is possible to transmit 8000 bytes per second.

The incoming byte from the electronic device 1 via the expansion card connection 8a, 8b is transmitted to a transmission buffer TxFIFO (transmit first in first out), from where the byte is transmitted by the synchronous serial connector block 24 to the synchronous serial bus 21, under control of the byte synchronisation signal PCMSClk. Upon entry of a byte, it is also possible to generate an interrupt signal to the control block 26. In this mode, the digital signal processing unit 16 is not used for controlling the transfer of bytes. In the block mode, the synchronous serial connector block 24 receives bytes coming from the electronic device 1 in the transmission buffer TxFIFO. The block size is e.g. 20, 40 or 60 bytes, wherein a number of bytes, corresponding to the block size used at the time, is received in the transmission buffer before sending them to the synchronous serial bus 21. The control block of the bus connection circuit 22 contains information on the space in the transmission buffer. At the stage when the number of bytes in the transmission buffer corresponds to the block size, the control block 36 generates an interrupt signal or the like to the microprocessor 2 of the electronic device. As a result, the writing of bytes into the expansion card connection 8a, 8b is stopped in the virtual device controller 30 until the fill rate of the block buffer is again smaller than the block size.

When the transmission buffer becomes full, the digital signal processing unit 16 generates a block synchronisation signal to the synchronous series connection block 24. Thus, the synchronous serial connector bus 24 starts the transmission of bytes to the synchronous series bus 21.

The control block 26 of the bus connection circuit generates a synchronisation signal (PCMDClk) in the bit synchronisation line 35 for transmitting bits to the synchronous serial bus 21. This synchronisation signal is used also for the reception of bits from the synchronous serial bus 21, because in this embodiment the transmission and reception on the synchronous serial bus 21 takes place advantageously simultaneously so that upon the ascending edge of the synchronisation signal, a bit is transmitted, and upon the descending edge, a bit is received. The control block of the series connector circuit 22 generates a synchronisation signal (PCMSClk) also in the byte synchronisation line 36.

The bytes transmitted to the synchronous serial bus 21 are conducted to a high frequency part 19 where the bytes are possibly subjected to compressing and channel coding (modulation) for transmission on the radio channel. In a corresponding manner, signals received from the radio channel are subjected to channel decoding and possibly decompression, whereafter the digital audio signals can be transmitted to the synchronous serial bus 21.

On the asynchronous serial bus 20, advantageously one initial bit and one terminal bit are added for each byte to be transmitted. On the basis of these initial and terminal bits, it is possible at the receiving end to distinguish the bits belonging to each received byte, as known. Actual synchronisation signals are not used.

FIG. 4 shows an example on an electronic device 1 and a expansion card 13 set in the second function mode. The electronic device 1 comprises e.g. a microprocessor 2, an audio coding/decoding circuit 37 (codec), a display 38 and a keypad 39. The mode selection line 27 is set by the electronic device 1 to the ground potential, wherein the expansion card 13 is set in the second function mode. Thus, the lines of the synchronous serial bus 21 and the asynchronous serial bus 20 are directly connected on the side of the expansion card to the expansion card connection 8b. Signals are thus transmitted in serial form between the expansion card 13 and the electronic device 1. For example a sound signal, which has been converted in the audio coding/decoding circuit into a digital audio signal, is transmitted via the expansion card connection 8a, 8b to the digital signal processing unit 16 to be converted into a form to be transmitted on the radio channel. In a corresponding manner, digital audio signals which have been received from the radio channel and decoded, are transmitted in serial form into the audio coding/decoding circuit 37 of the electronic device. In the audio coding/decoding circuit 37, the digital audio signals are converted into analog form and conducted e.g. to the loudspeaker 6 of the electronic device. In this embodiment, the bit synchronisation signal and the byte synchronisation signal are arranged via a synchronisation bus 42 from the microprocessor 2 of the electronic device, but the synchronisation signals can also be generated e.g. in the audio coding/decoding circuit 37, in the control block 26 or in the digital signal processing unit 16. In the digital signal processing unit, the audio signals are in digital form; consequently, there is a need for analog/digital converters (A/D) for converting analog signals, such as the signal generated by a microphone 7, into digital form, and digital/analog converters (D/A) for converting a digital signal into analog form, e.g. into a signal to be transmitted to a loudspeaker 6. These A/D and D/A converters are in this embodiment contained in the audio coding/decoding circuit 37 (codec), shown in the block diagram of FIG. 4, applying pulse coded modulation PCM, known as such.

The electronic device can be an auxiliary device unit of the type of a personal digital assistant (PDA), a portable data processor (PC), as shown in FIG. 1, a telephone handset, hands free equipment for a mobile station, etc.

The invention is not limited solely to the embodiments presented above, but it can be modified within the scope of the appended claims.

What is claimed is:

1. A method for transmitting a digital audio signal between an electronic device (1) and an expansion card (13) connected to an expansion card connection (8a) in the electronic device, the expansion card (13) comprising at least one data transmission bus (20) for transmitting control and data signals, means (16) for processing digital signals, and an expansion card connection (8b), wherein the expansion card (13) comprises a second data transmission bus (21), wherein digital audio signals are transmitted via said second data transmission bus (21).

2. The method according to claim 1, wherein the first data transmission bus (20) is an asynchronous serial bus and the second data transmission bus (21) is a synchronous serial bus.

3. The method according to claim 1, wherein the timing and control of the data transmission buses (20, 21) is conducted by a bus connection circuit (22) provided in the expansion card (13).

4. The method according to claim 3, wherein the expansion card (13) has at least a first function mode, such as a function mode according to the PCMCIA standard, wherein digital audio signals are transmitted in serial form between the digital signal processing means (16) and the bus connector circuit (22).

5. The method according to claim 4, wherein digital audio signals are subjected to serial/parallel conversion for the transmission of the digital audio signals between the expansion card connection (8a) of the electronic device and the second data transmission bus (21).

6. The method according to claim 3, wherein the expansion card (13) has also a second function mode, wherein digital audio signals as well as control and data signals are transmitted in serial form between the expansion card connection (8a) of the electronic device and the second data transmission bus (21).

7. The method according to claim 1, wherein the expansion card (13) comprises a transmitter/receiver unit (19) for a mobile station (19).

8. An expansion card (13) comprising:
a digital signal processing unit (16),
at least one data transmission bus (20) for transmitting control and data signals, and
an expansion card connection (8b) for connecting the expansion card (13) with the expansion card connection (8b) of an electronic device (1),
wherein the expansion card (13) comprises further a second data transmission bus (21) for transmitting digital audio signals between the expansion card (13) and the electronic device (1).

9. The expansion card (13) according to claim 8, wherein the first data transmission bus (20) is an asynchronous serial bus and the second data transmission bus (21) is a synchronous serial bus.

10. The expansion card (13) according to claim 8, wherein the expansion card (13) comprises a bus connection circuit (22) for conducting the timing and control of the data transmission buses (20, 21).

11. The expansion card (13) according to claim further comprising at least a first function mode, such as a function mode according to the PCMCIA standard, wherein the expansion card (13) comprises further means (24, 26) for transmitting digital audio signals in serial form in a synchronized manner between the digital signal processing unit (16) and the bus connection circuit (22).

12. The expansion card (13) according to claim 8, further comprising means (25) for conducting serial/parallel conversions on digital audio signals for their transmission between the expansion card connection (8a) of the electronic device and the second data transmission bus (21).

13. The expansion card (13) according to claim 8, further comprising a second function mode, wherein digital audio signals are arranged to be transmitted in serial form between the expansion card connection (8a) of the electronic device and the second data transmission bus (21).

14. The expansion card according to claim 8, further comprising a transmitter/receiver unit (19) for a mobile station.

15. A mobile station (13) comprising:
a digital signal processing unit (16),
at least one data transmission bus (20) for transmitting control and data signals, and
an expansion card connection (8b) for connecting the mobile station (13) with the expansion card connection (8b) of an electronic device (1),
wherein the mobile station (13) comprises further a second data transmission bus (21) for transmitting digital audio signals between the mobile station (13) and the electronic device (1).

* * * * *